(No Model.)
J. R. SANDAGE.
AXLE SKEIN.
No. 312,765. Patented Feb. 24, 1885.
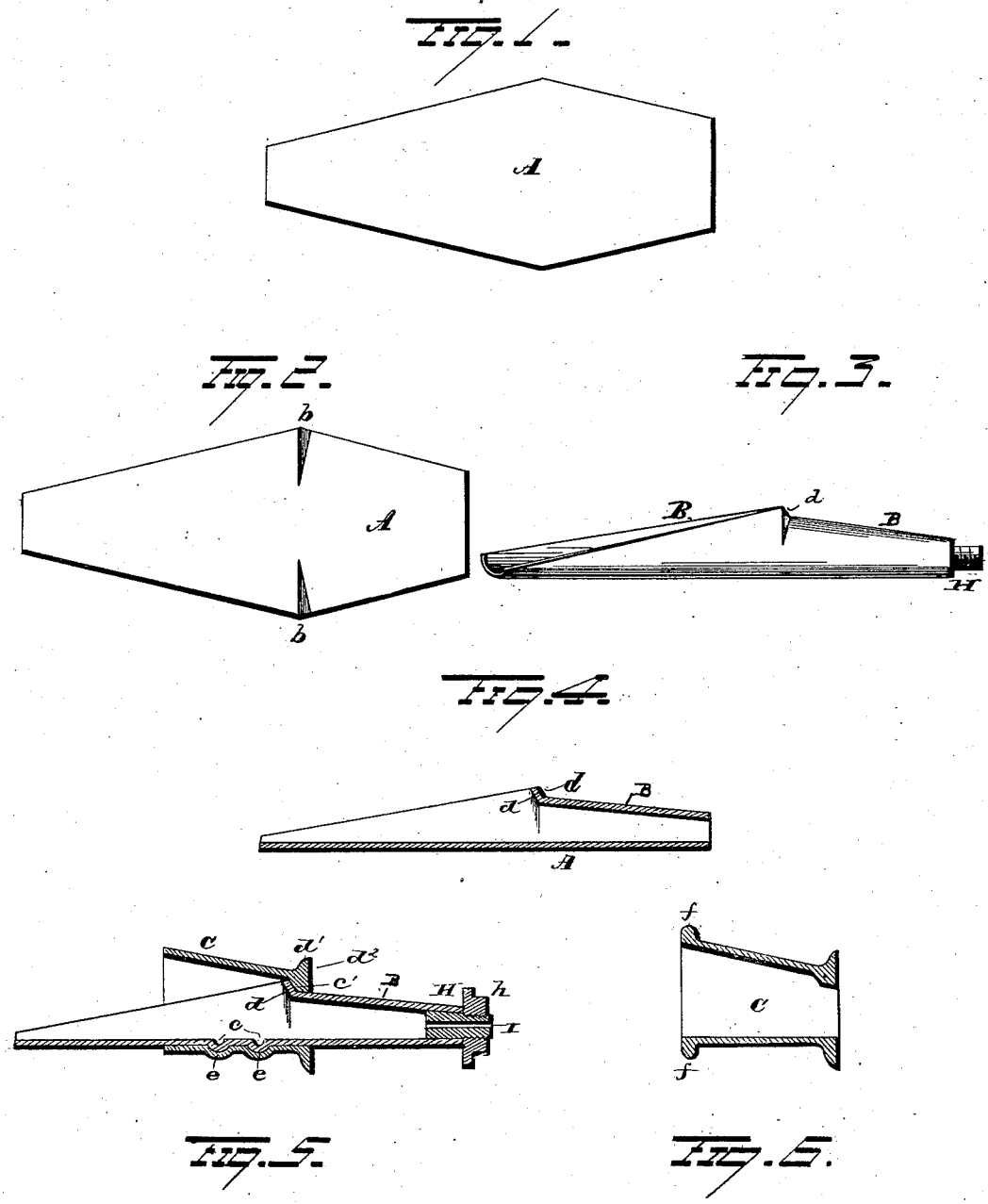

UNITED STATES PATENT OFFICE.

JACOB R. SANDAGE, OF SOUTH BEND, INDIANA, ASSIGNOR OF ONE-HALF TO JOSHUA SANDAGE, OF SAME PLACE.

AXLE-SKEIN.

SPECIFICATION forming part of Letters Patent No. 312,765, dated February 24, 1885.

Application filed July 3, 1884. (No model.)

*To all whom it may concern:*

Be it known that I, JACOB R. SANDAGE, of South Bend, in the county of St. Joseph and State of Indiana, have invented certain new and useful Improvements in Axle-Skeins; and I do hereby declare the following to be a full, clear, and exact description of the invention, such as will enable others skilled in the art to which it appertains to make and use the same.

My invention relates to an improvement in axle-skeins, the object being to provide an axle-skein of rolled metal which shall be simple and economical in manufacture and durable in its construction; and with these ends in view my invention consists in certain features of construction and combinations of parts, as will be hereinafter described, and pointed out in the claims.

In the accompanying drawings, Figure 1 represents one form of blank from which to form a thimble-skein embodying my invention. Fig. 2 represents the blank with portions thereof upset to form ribs on the upper sides of the skeins. Fig. 3 is a view in perspective of the skein before the collar or sleeve has been fastened thereto. Fig. 4 is a longitudinal section of the same. Fig. 5 is a longitudinal section of the skein and collar or sleeve, and Fig. 6 is a similar view of a modification.

A represents one form of blank from which the skein may be produced, although I do not restrict myself to this particular form of blank, as others differing therefrom in shape and relative proportions may be employed with the same result. Blank A is bent into cylindrical form, as shown in Fig. 3, and at the same time is upset at *b b* to form a rib, *d*, on the upper side of the skein for a purpose to be hereinafter described. Upon the skein portion B is then driven or shrunk a sleeve, C, the upper side of which is formed with a flange, *c'*, that engages the rib *d* on the upper side of the skein, and is also formed with an upwardly-projecting flange, *d'*, thereby producing a broad bearing, *d²*, on the upper side of the skein for the inner end of the hub. This sleeve may be made of rolled plate material, welded together and then shrunk onto the skein, the latter having been previously welded, and the sleeve then welded to any portion of the skein, either the top, bottom, or side; or the sleeve, before welding, may be driven onto the skein before the latter has been welded, and then the operation of welding both the sleeve and the skein and welding them together be performed simultaneously in a suitable die. After the sleeve has been welded to the skein, grooves or indentations *e* are formed by means of a suitable die in the lower part of the skein and sleeve, thus interlocking them, and holding the sleeve securely in the skein and preventing the slipping or loosening of the hound-brace or clip-plate hook. The sleeve may be further strengthened by having a rib or flange, *f*, formed on its outer edge, as illustrated in Fig. 6. Within the outer end of the skein is inserted a plug, H, which is secured in place by welding. The outer and projecting end of the plug is reduced in size and screw-threaded for the reception of the nut *h* for retaining the hub on the skein. The plug H is provided with a hole, *i*, through which is inserted the skein-bolt for attaching the skein to the axle-tree.

In the manufacture of my improved skein but very little plate metal is wasted as scrap, as the blank may be of such form that nearly all of the plate may be utilized. The sleeve or collar insures a wide and firm inner bearing for the hub and also insures an extended bearing for the skein on the axle-tree, and thereby enables it to be securely held against displacement.

It is evident that many slight changes in the construction and relative arrangement of parts might be resorted to without departing from the spirit of my invention, and hence I do not restrict myself to the exact construction and arrangement of parts shown and described; but, Having fully described my invention, what I claim as new, and desire to secure by Letters Patent, is—

1. A wagon-skein made of plate metal and formed with a rib on its upper side, in combination with a sleeve embracing the skein and projecting inwardly over the rib.

2. A wagon-skein made of plate metal and formed with a rib on its upper side, in combination with a sleeve embracing the skein and provided with a flange to engage said rib, the said sleeve projecting inwardly over the rib, substantially as set forth.

3. A wagon-skein made of plate metal and provided with a rib, in combination with a sleeve larger at one end than at the other, secured on said skein against the rib.

4. A wagon-skein made of plate metal and provided with a rib, the portion of the skein inside of the rib being open on its upper side, in combination with a sleeve secured on the spindle and projecting inwardly, substantially as set forth.

5. In a wagon-skein, the combination, with a plate-metal skein provided with a rib on its upper side, of a sleeve provided with a flange to engage said rib, and with grooves to receive ribs on the under side of the skein, substantially as set forth.

In testimony whereof I have signed this specification in the presence of two subscribing witnesses.

JACOB R. SANDAGE.

Witnesses:
EDWARD N. SANDAGE,
W. D. GREENE.